United States Patent [19]

Gitman

[11] E Patent Number: Re. 33,464

[45] Reissued Date of Patent: Nov. 27, 1990

[54] METHOD AND APPARATUS FOR FLAME GENERATION AND UTILIZATION OF THE COMBUSTION PRODUCTS FOR HEATING, MELTING AND REFINING

[75] Inventor: Grigory M. Gitman, Duluth, Ga.

[73] Assignee: American Combustion, Inc., Norcross, Ga.

[21] Appl. No.: 306,816

[22] Filed: Feb. 3, 1989

Related U.S. Patent Documents

Reissue of:

[64] Patent No.: 4,642,047
Issued: Feb. 10, 1987
Appl. No.: 755,831
Filed: Jul. 15, 1985

U.S. Applications:

[63] Continuation-in-part of Ser. No. 642,141, Aug. 17, 1984, abandoned.

[51] Int. Cl.[5] ..... F27B 14/00

[52] U.S. Cl. ..... 432/13; 239/424; 239/425; 239/433; 431/10; 431/181; 432/37

[58] Field of Search ..... 432/13, 37, 222; 239/418, 423, 424, 424.5, 425, 419.3, 433; 431/10, 165, 181, 351, 352

[56] References Cited

U.S. PATENT DOCUMENTS

| | | | |
|---|---|---|---|
| 1,721,381 | 7/1929 | Ellis | 239/425 |
| 3,127,156 | 3/1964 | Shepherd | 263/43 |
| 3,216,714 | 11/1965 | Eibl et al. | 239/422 |
| 3,224,486 | 12/1965 | Geller et al. | 158/4 |
| 3,729,285 | 4/1973 | Schwedersky | 431/8 |
| 3,880,571 | 4/1975 | Koppang et al. | 431/8 |
| 3,889,933 | 6/1975 | Jaquay | 239/422 |
| 4,017,253 | 4/1977 | Wielang et al. | 432/58 |
| 4,021,191 | 5/1977 | Le Haye | 431/353 |
| 4,278,418 | 7/1981 | Strenkert | 431/8 |
| 4,342,551 | 8/1982 | Browning | 431/10 |
| 4,475,885 | 10/1984 | Finke | 239/433 |
| 4,521,183 | 6/1985 | Hirai et al. | 432/37 |
| 4,525,175 | 6/1985 | Stellaccio | 239/422 |
| 4,541,796 | 9/1985 | Anderson | 431/10 |

*Primary Examiner*—Henry C. Yuen
*Attorney, Agent, or Firm*—Needle & Rosenberg

[57] ABSTRACT

Method and apparatus for high temperature heating, melting, refining and superheating of materials, such a steel scrap, metals, ceramics or glass. The invention provides an economizing method of hydrocarbon fluid fuel combustion in an ongoing flame in a liquid cooled combustion chamber by separately supplying streams of fuel and at least two oxidizing gases wherein a first oxidizing gas reacts with the fuel, and a second oxidizing gas is directed about the flame core to further react with the fuel, while controlling the flow of the fuel, the oxidizing gases and cooling liquid to provide the required heat input, combustion product chemistry, temperature, velocity, emissivity and combustion block temperature. Also disclosed are burners for carrying out the invention.

94 Claims, 4 Drawing Sheets

METHOD AND APPARATUS FOR FLAME GENERATION AND UTILIZATION OF THE COMBUSTION PRODUCTS FOR HEATING, MELTING AND REFINING

Matter enclosed in heavy brackets [ ] appears in the original patent but forms no part of this reissue specification; matter printed in italics indicates the additions made by reissue.

This application is a continuation-in-part of application Ser. No. 642,141, filed Aug. 17, 1984, *abandoned.*

BACKGROUND OF THE INVENTION

This invention relates to a method and apparatus for high temperature heating, melting, refining and superheating of materials, such as steel scrap, metals, ceramics or glass. The method and apparatus disclosed may be used as the major source of energy and also as an assisting energy source in melting furnaces, industrial heating and heat treating furnaces, kilns, incinerator and other high temperature applications.

Today, scrap preheating and melting is accomplished by different technologies, such as heat from the combustion of coke, oil or gas with air or oxygen, or from electric arc. Each of these technologies has some advantages and disadvantages. Using air from combustion has the advantage of being a low cost oxidizer, but, because air only contains 21% oxygen, it has the following disadvantages: low flame temperature, combustion instability inside cold scrap, low efficiency of heat utilization when scrap is hot due to escaping flue gases which waste about 50% of heat released by combustion.

The advantages of using essentially pure oxygen for combustion include: high flame temperature, good combustion stability, and a significant reduction of wasting heat with hot flue gases. The disadvantages of oxygen include its high cost and the necessity to cool the oxygen-fuel burner body.

The utilization of electrical energy is very expensive, but it provides a convenient means of operation and high product quality.

Four methods of oxygen introduction in the combustion process are used today:

- injecting an oxygen stream into the fuel/air flame after the flame has left the fuel/air burner;
- injecting an oxy-fuel burner flame into a fuel/air burner flame after both flames have left their burners;
- enriching combustion air with oxygen by injecting oxygen in combustion air prior to supplying combustion air to the oxygen enriched air burner; and
- mixing of fuel, oxygen and air streams external to the burning device by lancing the three streams inside a hot furnace where said mixtures are burned.

The first two techniques of oxygen injection are recommended for increasing liquid and solid flame temperatures at glass melting furnaces or other high temperature furnaces where such fuel/air flames have sufficient dimensions and are located above the work being heated and are available for oxygen injection outside of the burner body. A high velocity oxy-fuel flame or an oxygen jet penetration into the core of a relatively cold oil or coal flame will superheat said core, therefore increasing the radiative heat flux of the micro-particles of carbon existing in such flame core without overheating the burner body. Oxygen enrichment of combustion air may be used for any fuel including hydrocarbon gases, particularly, natural gas. The oxygen enriched air burner has not found broad application for several reasons.

Burners for combusting fuel with air are old in the art, and burners for combusting fuel with pure oxygen (oxy-fuel) or oxygen enriched air are well known. However, the current state of the art burners do not operate satisfactorily across the full range of temperatures useful in high temperature heating, and do not allow for economical operation through control of flame chemistry, temperature, velocity and luminosity. Burners designed for use with hot air or oxygen enriched air typically use refractory tiles in the burners for continuous igniting of gases to stabilize the flame. However, due to the very high temperature of an oxy-fuel flame, refractory tiles cannot be used, and such burners are internally water or air cooled. The elimination of the burner tiles results in flame instability at lower temperatures and therefore limits the turn-down ratio of oxygen enriched air burners.

Another problem that often arises in oxy-fuel and oxygen enriched burners is the presence of excess oxygen in the flue gases. The hot furnace temperatures, together with the excess oxidizing ability of the flue gases, accelerate deterioration of expensive furnace components.

Also, in cases where natural gas is utilized as a fuel, an oxygen-fuel flame or an oxygen enriched air-fuel flame is not emissive. To be able to transfer heat, the flame would therefore have to touch the product being heated. This can create a problem with product distortion and oxidation.

The above mentioned technical, environmental and economical difficulties of oxygen enriched air burners are caused by the fact that using oxygen enriched air makes the combustion of fuel faster and less controllable inside of traditionally designed burning devices. These typically have a refractory lined combustion tunnel and use relatively lazy mixing techniques based on the low pressure of oxygen enriched air, the flow of which can be regulated by a traditional gas/air ratio regulator.

SUMMARY OF THE INVENTION

In general, the total cost (operating and capital) of transferring of each BTU into a product being heated varies for each particular application as a function of temperature. As the temperature of the product increases, it becomes more expensive to transfer additional BTU's from the source of energy into the product being heated. In general, the same amount of hydrocarbon fuel being combusted by various combustion devices at the same furnace temperature conditions may result in a different total heat flux being directed from the flame toward the work being heated. This is caused by different flame chemistry, temperature, luminosity and velocity resulting in different convective and radiative heat flux and by the influence of additional heat input from chemical reaction which may take place between work material and combustion gases.

The least expensive way to accomplish heat transfer to the product at the low temperature stage of the heating cycle is to increse the flame velocity to increase the conventive heat flux from the source of energy to the product being heated. When the product temperature exceeds approximately 1500°-1700° F. the most efficient way of heat transfer is to increase the flame temperature and flame luminosity to increase the radiative heat flux from the source of energy to the product. Raising the temperature of the flame increases the convection heat flux by the first power, but increases the radiative heat flux by the fourth power. Hence, oxygen utilization is more efficient during the high temperature period. This changing of the flame, to go from convective heating to radiative heating, is accomplished in this invention by continuously optimizing the fuel-air-oxygen flame chemistry to control temperature, velocity, luminosity and heat input. Optimization by the invented combustion process is due to a more controllable oxidation of the fuel stream by mixing said fuel stream with two different oxygen and/or air based oxidizing gases, having continuous control of the process oxidizing capability, and by having said two oxidizing streams separately contact and mix with the fuel stream being burned inside of the intensively liquid cooled combustion chamber of the combustion device.

Controllable variation of proportions of air and oxygen contained in said two different oxidizing gases during the firing cycle provides a new method of controlling the flame characteristics independent of the firing rate. This makes it possible to maximize the efficiency of heat transfer from the flame toward the work being heated by, for instance, increasing the flame velocity and, therefore, convective heat transfer during a low temperature period of the heating cycle, and by increasing the flame luminosity during a high temperature period of the heating cycle.

Furthermore, in the case of melting, if some components of the product being heated can be oxidized through exothermic reactions without reducing the product quality, excess oxidizing mixture or pure oxygen (metallurgical oxygen) can be directed toward the hot zone of the product being heated to generate intensive exothermic reactions on the surface and inside the product. To improve the ability of the metallurgical oxygen to penetrate inside the product, it may be introduced with supersonic velocity, or under high pressure, along the central line of the flame pattern so as to deliver a concentrated oxygen stream to the hottest zone of the work surface being heated by the flame pattern.

In addition, it may be desirable to provide a separate stream of oxygen directed downward toward the surface of the product being heated closer to the furnace wall, so that a larger area of the surface may be oxidized through exothermic reactions.

Utilization of the present invention for metal scrap heating, melting and refining includes the steps of: initial heating of scrap pile with a fluid fuel-air flame with some oxygen being introduced inside the flame core for mixing with the fluid fuel to form a stable combustion zone, which is used as a continuous ignitor during the combustion step, with the total oxygen/fuel ratio near stoichiometric; increasing the oxygen/air ratio to raise the flame temperature with the total oxygen/fuel ratio still close to stoichiometric; introducing through the fluid fuel-air-oxygen flame a jet of excess oxygen directed to the hot scrap pile when it is preheated above 1600° F., to start exothermic oxidation reactions to accelerate scrap melting; heating the molten metal during refining with a fluid fuel-air flame (or a fluid fuel-air-oxygen flame); refining the molten metal by oxidation of the molten metal with a jet of excess metallurgical oxygen directed through the fluid-air flame (or the fluid fuel-air-oxygen flame) toward the molten metal with high velocity, which may be maintained above sonic.

A number of the improvements resulting from the new combustion method and flame generating apparatus are described.

First, intensive mixing of the oxygen stream with a hydrocarbon fuel inside of a volume insulated by the air stream from contact with the cold, water-cooled wall of the combustion chamber protects such volume from cooling and at the same time provides residual time for oxygen and gas to react to create a very high temperature stabilizing zone prior to involving the major part of the air into the combustion process. Also, the heat released by combusting part of the hydrocarbon gas with the very high oxygen concentration of the first oxidizing gas provides the heat release required for partial pyrolysis of the remaining gas which forms a highly luminous flame core.

Second, the very high rate of reaction of the gas with the oxygen provides a very intensive heat release inside the combustion chamber which results in a high level of combustion gases expansion prior to leaving the combustion chamber, therefore providing a very high flame velocity.

Third, in many melting operations, the high temperature flame impinges upon scrap located at the nozzle of the combustion device and can therefore experience high aerodynamic resistence due to blockage. Because fuel, oxygen and air flow are introduced into the flame generator combustion chamber with different pressures, each of these flows may be differently affected by the scrap aerodynamic resistance or blockage. The high pressures of the oxygen and gas lines make their flows only slightly sensitive to such aerodynamic variations throughout the heating and melting cycles, but the relatively large amounts of combustion air with relatively low pressure would be measurably affected. In such a situation, despite the complete opening of the flow regulating valves, the air flow would not be able to deliver the required amount of oxygen to the combustion tunnel to maintain the desired firing rate. The control system of the flame generator is capable of recognizing this problem through continuous air flow sensors and reacting properly by increasing oxygen flow to make up for the air deficiency and to create a hotter flame in order to melt through material blocking the burner outlet. Similar problems can occur during the period of excess oxygen blowing if oxygen flow is affected by scrap aerodynamic resistence.

It is an object of this invention to minimize energy consumption and cost of heating, melting and refining operations by increasing the efficiency of heat generation and utilization by continuously optimizing the fuel-air-oxygen flame chemistry, temperature, velocity, luminosity, and heat input.

It is also an object of this invention to introduce throuqh a burner flame subsonic on supersonic oxyqen jets for oxidation and refining of hot materials.

It is a further object of this invention to provide a burner with assured flame stability over a broad opeating range.

It is a still further object of this invention to provide a heating method and apparatus which reduces flue gas volume and pollutants.

It is yet another object of this invention to automatically control and optimize the heating, melting and refining of materials.

These and other objects and advantages will appear from the following description with reference to the drawings.

DESCRIPTION OF PREFERRED EMBODIMENTS

The preferred embodiments are now described with reference to the drawings, in which like numbers indicate like parts throughout the views.

Figure 1:
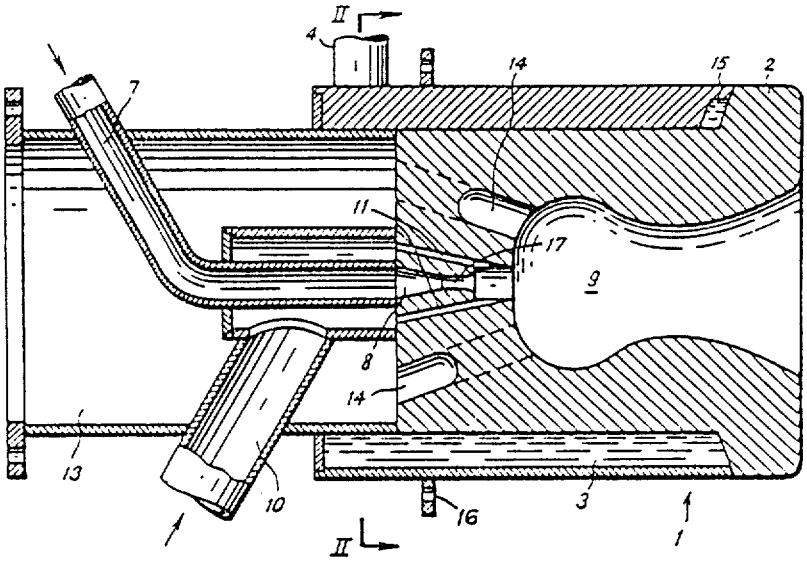
FIG. 1 is a side cross-sectional view through the center of a flame generator illustrating a first embodiment of the invention.
Figure 2:
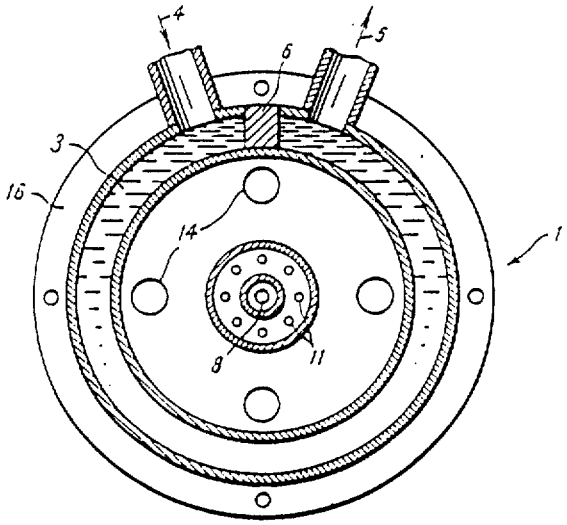
FIG. 2 is a rear cross-sectional view of the flame generator of FIG. 1, taken along line II—II of FIG. 1.

FIGS. 1 and 2 show a first embodiment of the flame generator 1, which comprises a generator combustion block 2. A water cooling jacket 3 surrounds the generator combustion block 2, and has a water inlet 4 and outlet 5 located next to each other, and a dividing plate 6 between the inlet 4 and the outlet 5 to cause the cooling water to circulate around the combustion block 2. An oxygen conduit 7 connects to the oxygen channel 8 through the combustion block 2 for introducing oxygen into the combustion chamber 9 of the combustion block. A fluid fuel conduit 10 provides a fluid fuel to a plurality of fuel channels 11 through the combustion block 2, said channels spaced symmetrically around the oxygen channel 8 angled to direct the fuel to a point on the center line of the combustion block within the combustion zone 9. The oxygen channel may have a converging-diverging nozzle 17 for directing a supersonic jet of oxygen to a product being heated. Additionally, an air supply conduit 13 provides air to a plurality of air channels 14 through the combustion block 2. Preferably, the air channels 14 are symmetrically spaced and tangentially directed into the combustion chamber with openings on the face of the combustion zone 9. In addition to supplying oxidizing gas to participate in the combustion reaction, gas introduced through openings 14 will serve to protect the wall of the combustion chamber from the high temperature combustion product and also to protect the flame from cooling by contact with the liquid cooled body, by creating a thin gas film between the wall and the combustion product. Furthermore, the combustion block 2 may be further cooled by the passing of cool air through the air channels 14 and cool fuel through the fuel channels 11 as they are introduced into the combustion chamber 9. A slot 15 is provided to the cooling jacket 3 for evacuation of air and steam bubbles. Flange 16 provides a means for affixing the flame generator to a furnace.

Oxygen channel 8 can have a multiplicity of holes at the nozzle. This option increases the flexibility of the flame generator to vary the properties of the flame and the excess oxygen jet directed through the central portion of the combustion chamber.

In certain cases it can be beneficial to introduce fuel as the central stream through conduit 7 and oxygen or air-oxygen mixture through conduit 11 to maximize the flame length or emissivity.

Figure 3:
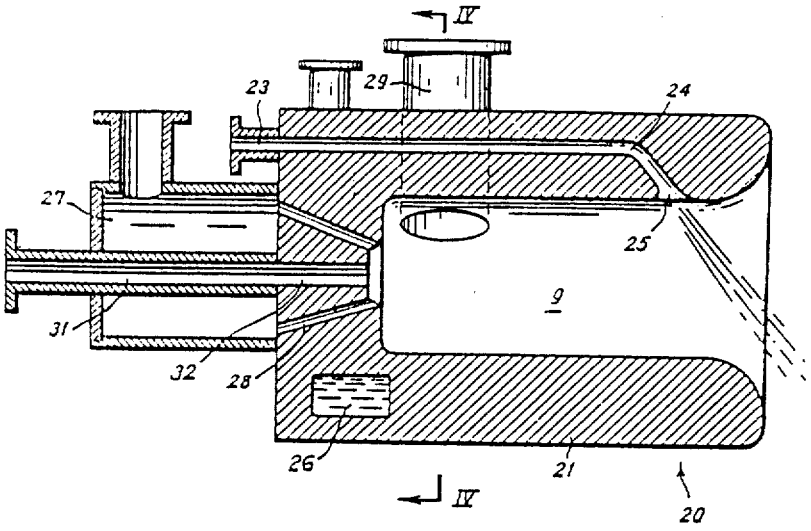
FIG. 3 is a side cross-sectional view through the center of a flame generator illustrating a second embodiment of the invention.
Figure 4:
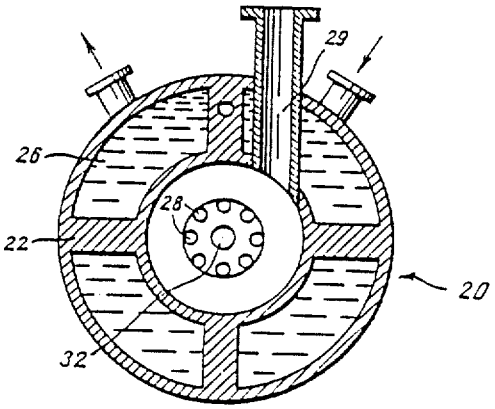
FIG. 4 is a rear cross-sectional view of the flame generator of FIG. 3, taken along line IV—IV of FIG. 3.

FIGS. 3 and 4 show a second embodiment of a flame generator 20. Similar to the previous embodiment, this embodiment includes a combustion block 21, a water cooling jacket 22 with water passages 26. Additionally, the fuel conduit 27, fuel channels 28, oxygen conduit 31 and oxygen channel 32 are similar to the previous embodiment. Air introduction is accomplished through a channel 29 which goes through the combustion block 21 and directs the air tangential to the inner surface of the combustion channel 9. Also, a second oxygen conduit 23 supplies oxygen through channel 24 through the top of the combustion block along its length until the passage turns downward and opens near the opening of the combustion block such that oxygen may be directed in a stream out of the combustion chamber angled downward with respect to the centerline of the flame generator 20. This opening may comprise a converging-diverging nozzle 25 for producing a supersonic jet of oxygen.

Figure 5:
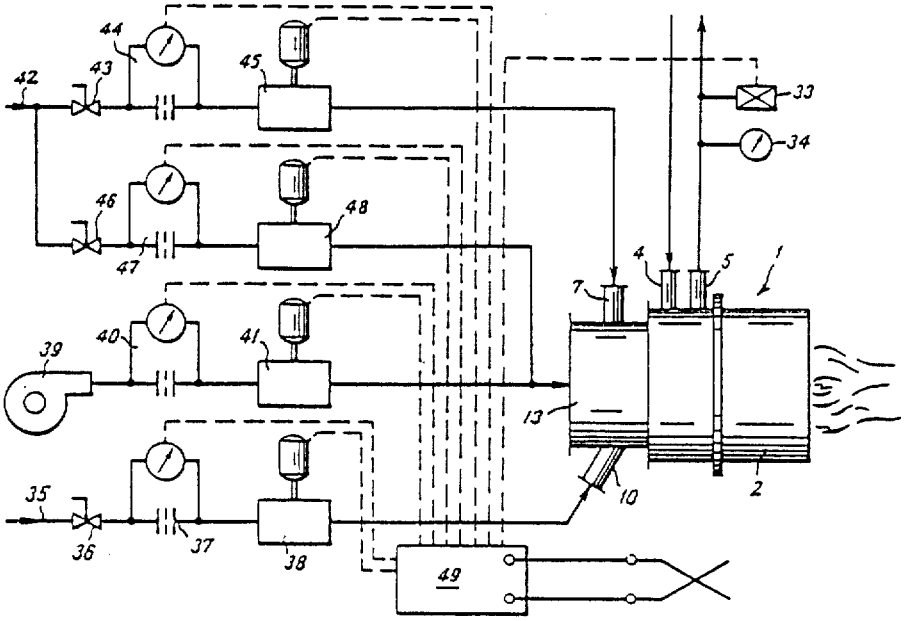
FIG. 5 is a schematic diagram of the control system for a first embodiment of the invention.

FIG. 5 shows the control system for the first embodiment of the flame generator. When the flame generator 1 is in operation, cooling water is supplied from a water supply line to water inlet 4 then around the combustion block 2 inside the water jacket and escapes through outlet 5. The required cooling rate is controlled by thermometer 33 and pressure gauge 34. To provide intensive cooling of all surface areas of the flame generator block 2 said block is made of copper or other material with very high thermal conductivity.

Concurrently, fuel is delivered from fuel supplying line 35 through valve 36, flowmeter 37 and controlling valve 38 to the flame generator 1 and then through fuel conduit 10 and the plurality of fuel channels into the combustion chamber. The oxidizer is delivered into the combustion chamber by different ways depending on whether the process is in the stage of heating, melting or superheating. When the temperature of the material being heated is relatively low, the ratio of air/oxygen will be relatively high and an air jet is delivered from blower 39, through flow meter 40, controlling valve 41, air conduit 13 and the plurality of air channels, into the combustion chamber. At the same time, an oxygen jet can be delivered from oxygen line 42 into the combustion chamber by any or both of the following two ways: first, through valve 43, flow meter 44, controlling valve 45, oxygen conduit 7 and oxygen channel 8; and second, through valve 46, flow meter 47, controlling valve 48, air conduit 13, and the plurality of air channels 14.

An automatic control device 49 controls the various instant flows of oxygen, air and fuel based on the current stage of the heating cycle as determined by certain sensors, such as temperature sensors, energy totalizers and timers. The control device may also include metering of instant fuel, air and oxygen flows to provide electrical inputs to the control device, which is preferably micro-processor programmed to control optimum flame characteristics throughout the heating cycle.

Figure 6:
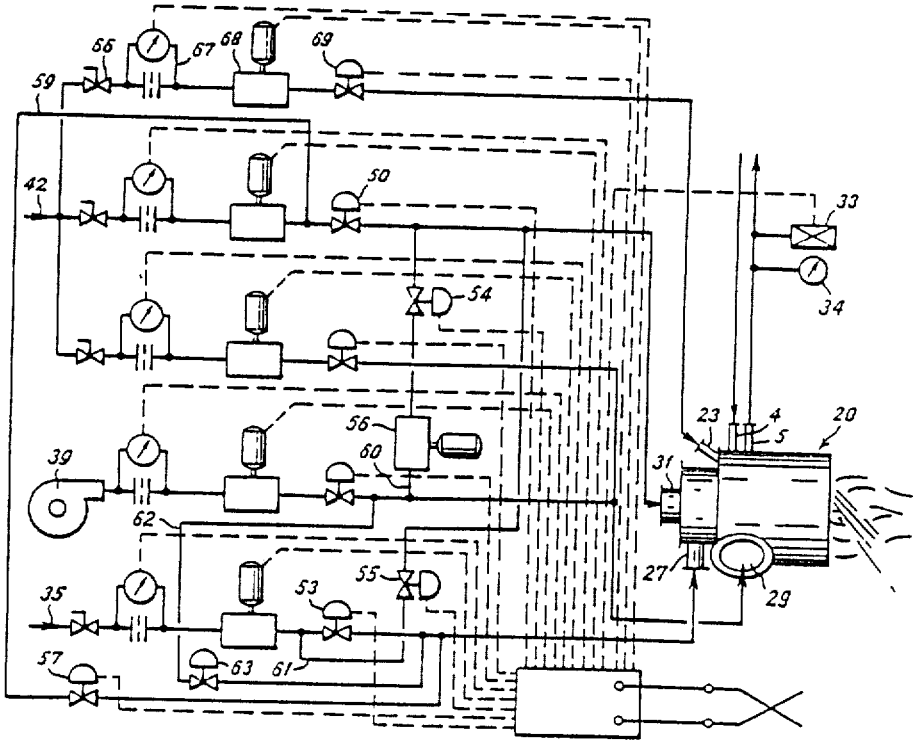
FIG. 6 is a schematic diagram of the control system for a second embodiment of the invention.

FIG. 6 shows the second embodiment of the flame generator control system which provides additional flexibility to flame generator operation by making it possible to introduce a controllable amount of air into the first oxidizing gas through line 60, motorized valve 56, and solenoid 54 to oxygen conduit 31. This embodiment also makes it possible to change the flame pattern and flame luminosity by introducing a fuel stream along the central line of the combustion chamber through line 61 and solenoid 55 to conduit 31 instead of the first oxidizing gas, which is blocked by solenoid valve 50, and, at the same time, by introducing the first oxidizing gas into the combustion chamber about said central fuel stream through line 59 and solenoid valve 57 to conduit 27 instead of fuel, which is blocked by solenoid 53.

Prior to the above mentioned exchange between the fuel and first oxidizing gas flow, air purging needs to be accomplished by flowing air through line 60, motorized valve 56 and solenoid 54 to oxygen conduit 31, and also through line 62, solenoid 63 to conduit 27.

In a typical process, utilizing the first embodiment, as the temperature of the material being heated increases, more oxygen is introduced into the combustion chamber 9, thereby lowering the air/oxygen ratio and increasing the temperature of combustion. The ratio of fuel/total oxygen during this stage is maintained close to stoichiometric.

When the temperature of the material being heated achieves a point that makes utilization of heat of the exothermic reactions of oxidation economically reasonable, a jet of excess oxygen will be directed through oxygen conduit 7 and oxygen channel 8, through the center of the flame filling the combustion chamber 9, toward the hot product for the generation of heat of oxidation reactions for melting purposes. To increase the ability of the jet of excess oxygen to penetrate into the material being heated, the oxygen jet can be blown through a converging-diverging nozzle 17 with supersonic velocity. This will also reduce dilution of oxygen with the combustion product and the furnace atmosphere.

A jet of excess oxygen can also be directed through the flame filling the combustion chamber 9 toward molten material for refining or other purposes. The velocity of this excess oxygen jet can be increased above sonic to improve the ability of the jet to penetrate into the molten material by use of a convergingdiverging nozzle. At the same time, a fuel-air, fuel-oxygen, or fuel-air-oxygen flame can be directed at the molten material to heat the material about and inside the oxidation zone.

During the heating, melting, refining and superheating cycles the heat input, flame velocity, temperature, luminosity, shape of the flame envelope and the chemistry of the combustion product are controlled continuously by variation of the supply of fuel, air, and oxygen and also by variation of the ways these components are introduced into the combustion chamber, in order to satisfy the heating requirements with minimum operating costs. Thus, the amount of heat input from a burner is directly related to the amount of hydrocarbon fuel delivered into the burner. As described above, the invented process or apparatus provides oxygen to the combustion process either as pure oxygen or as air or a mixture of both. By controlling the ratio of fuel/total oxygen provided to the combustion process, the stoichiometric ratio at which complete combustion of the oxygen and fuel occurs may be maintained as desired to efficiently utilize the substance introduced into the burner. Furthermore, at any given fuel/total oxygen ratio, the temperature of the flame may be increased by causing the oxidizing gas to have a higher oxygen concentration. This is accomplished by varying the air and pure oxygen supplied to the burner to control the air/-total oxygen ratio. Although supplying pure oxygen is clearly more expensive than the use of air, at some point in a process the higher flame temperature may be desirable to more efficiently transfer hear to the product.

Another way to improve heat transfer is to increase the emissivity of the flame. A highly emissive flame comes from the conversion of atomic carbon from the hydrocarbon fuel into highly emissive molecular carbon inside the core of the flame. This is accomplished in the present invention by providing initial mixing of pure oxygen with the fuel to conduct fuel pyrolysis in the core of the flame, the flame being isolated from the intensively cooled combustion chamber wall by a stream of a second oxidizer of lower oxygen concentration, such as air or an air/oxygen mixture. Therefore, by controlling the ratio of hydrocarbon fuel/oxygen in the center of the flame while maintaining all other parameters at the desired values, the emissivity of the flame may be controlled.

Additionally, it is desirable to provide a burner that will eliminate or substantially reduce the NOx emissions which result from combustion with air at high temperatures (e.g., core temperature over 2700° F.). This may be accomplished by reducing air inside the flame core. Therefore, NOx may be reduced by controlling and maximizing the ratio of air introduced to the outside of the flame/air introduced to the center of the flame, for any given total air content to be introduced into the combustion chamber.

The burner described herein may utilize preheated air or a preheated air-oxygen mixture as an oxidizing gas. This may allow recovery of waste heat from the proess to provide the preheated air or a preheated air-oxygen mixture and make the operation more efficient.

While the preferable embodiments of the invention have been described, it will be understood that other apparatus can be designed where more than two different air and oxygen contained oxidizing gases may be used for further improving of combustion controllability of flame generator. Also it will be understood that other apparatus can be designed wherein a partial premixing of fuel with oxidizer or partial mixing of two oxidizing gases may be accomplished outside or inside of flame generator body.

While this invention has been described in detail with particular reference to preferred embodiments thereof, it will be understood that variations and modifications can be effected within the spirit and scope of the invention as previously described and as defined in the claims.

What is claimed is:

1. An economizing method of hydrocarbon fluid fuel combustion in an ongoing hydrocarbon flame formed in a combustion chamber within liquid cooled combustion block having an outlet nozzle directed into a hot furnace interior, to reduce the consumption of fuel and pure oxygen in heating processes, comprising the steps of:

separately supplying hydrocarbon fluid fuel and two different oxygen based oxidizing gases to the combustion chamber;

directing said first oxidizing gas having a given oxygen concentration through at least one opening in the combustion chamber wall toward said combustion chamber outlet nozzle;

directing said hydrocarbon fuel into said combustion chamber in the stream directed through at least one opening in the combustion chamber wall above and toward said first oxidizing gas so that said hydrocarbon fuel is caused to be mixed with said first oxidizing gas to stabilize combustion within the combustion chamber thereby creating a highly luminous hot flame core extending throughout said combustion chamber;

directing said second oxidizing gas having different oxygen concentrations from said first oxidizing gas through at least one opening in the combustion chamber wall into said combustion chamber is a stream directed about and toward said hydrocarbon fuel in the flame core so that said second oxidizing gas initially insulates said core from cooling by contact with the liquid cooled block prior to being mixed with said hydrocarbon fuel for final combustion;

discharging the products of combustion from the combustion chamber through a liquid cooled nozzle opening toward the furnace interior; and controlling the flow of said hydrocarbon fuel, said two oxidizing gases and cooling liquid.

2. The method of hydrocarbon fluid fuel combustion of claim 1, wherein said flow controlling step comprises the steps of:

controlling the ratio of fuel to total oxygen in said two oxidizing gases to enable efficient use of both said fuel and said oxidizing gases; and controlling the concentration of oxygen in said two oxidizing gases by adding controlled amounts of air for controlling the temperature of the hydrocarbon flame.

3. The method of hydrocarbon fluid fuel combustion of claim 2, wherein said flow controlling step further comprises the step of controlling the ratio of hydrocarbon fuel to the oxygen contained in said first oxidizing gas for controlling the emissivity of the hydrocarbon flame.

4. The method of hydrocarbon fluid fuel combustion of claim 3, wherein said flow controlling step further comprises the step of maximizing the ratio of air in said second oxidizing gas to the air in said first oxidizing gas for minimizing NOx emissions by reducing the amount of air inside the core of the hydrocarbon flame.

5. The method of claims 2, 3 or 4 which further comprises the step of monitoring the current process temperature for determining the appropriate ratios for said controlling steps as the process continues.

6. The method of claims 2, 3, or 4 which further comprises the steps of measuring the accumulated energy input to the process for determining the stage of the process and the ratios to be applied in said controlling steps as the process continues.

7. The method of claims 2, 3 or 4 which further comprises the step of timing the process for determining the stage of the process and the ratios to be applied in said controlling steps.

8. The method of claim 5, wherein said controlling steps are accomplished by electronic computer means.

9. The method of claim 6, wherein said controlling steps are accomplished by electronic computer means.

10. The method of claim 7, wherein said controlling steps are accomplished by electronic computer means.

11. The method of hydrocarbon fluid fuel combustion of claims 1, 2 or 3 wherein said first oxidizing gas is pure oxygen.

12. The method of hydrocarbon fluid fuel combustion of claims 1, 2 or 3, wherein said second oxidizing gas is air.

13. The method of hydrocarbon fluid fuel combustion of claims 1, 2 or 3, wherein said hydrocarbon fuel is introduced into said combustion chamber through a multiplicity of openings in the combustion chamber.

14. The method of claims 1 or 2, wherein said second oxidizing gas is introduced into the combustion chamber in a plurality of jets directed toward said flame core.

15. The method of claims 1 or 2, wherein said second oxidizing gas is introduced into the combustion chamber in at least one tangentially directed jet.

16. The method of claims 1 or 2, wherein said second oxidizing gas is directed to the hot flame core in increments along the length of the combustion chamber.

17. The method of hydrocarbon fluid fuel combustion of claims 2, 3 or 4 which further comprises the step of controlling the delivery of said first oxidizing gas into the combustion chamber such that the velocity of the jet entering the combustion chamber may range from subsonic to supersonic.

18. The method of hydrocarbon fluid fuel combustion of claim 5, which further comprises the step of controlling the delivery of said first oxidizing gas into the combustion chamber such that the velocity of the jet entering the combustion chamber may range from subsonic to supersonic.

19. The method of hydrocarbon fluid fuel combustion of claim 6, which further comprises the step of controlling the delivery of said first oxidizing gas into the combustion chamber such that the velocity of the jet entering the combustion chamber may range from subsonic to supersonic.

20. The method of hydrocarbon fluid fuel combustion of claim 7, which further comprises the step of controlling the delivery of said first oxidizing gas into the combustion chamber such that the velocity of the jet entering the combustion chamber may range from subsonic to supersonic.

21. The method of claims 1, 2 or 3, which further comprises the step of directing a third oxidizing gas from said combustion chamber outlet nozzle downwardly with respect to the center line of the combustion chamber, so that the third oxidizing gas may oxidize a different area of product being heated.

22. The method of claim 21 wherein said third oxidizing gas is oxygen introduced in a jet which has supersonic velocity.

23. A method of heating and melting materials in a furnace, comprising the steps of:

directing a flame produced within a liquid cooled combustion tunnel to the material to be heated, said flame formed by mixing and combusting a hydrocarbon fuel stream with air and oxygen, at a ratio of fuel to total oxygen about atoichiometric, said air and oxygen being combined, in two oxidizing gas streams of different oxygen concentrations, one of said gas streams being introduced inside said fuel stream and the other gas stream being introduced about said fuel stream;

raising the ratio of total oxygen to total air in the mixture, to increase the adiabatic flame temperature, as the temperature of the material increases, while maintaining the fuel to total oxygen ratio about stoichiometric, to achieve a temperature of the material at which an exothermic reaction of oxidation of some component of the material can be initiated; and then introducing excess oxygen to increase the ratio of total oxygen to fuel substantially above stoichiometric to provide additional heat from oxidation of some components of the materials in the furnace being continuously heated by the products of combustion.

24. The method of claim 23, when the opening of said combustion tunnel is partially or completely blocked by materials to be heated and melted, comprising the initial step of directing a hot flame at the material blocking the opening, said flame formed by mixing and combusting a hydrocarbon fuel stream with oxygen at a ratio about stoichiometric to create a hot cavity in the material at the opening of said combustion tunnel prior to carrying out the other steps of the method, for improving the stability of the low temperature flame in the following steps of the method.

25. The method of claim 23, also used to refine the material, which further comprises the steps of:

after the material is generally melted, reducing the fuel and air supplied to the combustion mixture, to rearrange the flame pattern;

directing a jet of oxygen at supersonic velocity through the flame to the material; and penetrating said supersonic jet of oxygen within the molten material at the zone at which the material is being heated by said rearranged flame, to continue the exothermic oxidation reaction of refining.

26. The method of claim 25 wherein said jet of oxygen is directed downward with respect to the direction of the flame.

27. The method of claims 23, 24, 25 or 26, wherein each step further comprises determining the most economical point at which to proceed to the next step.

28. The method of claims 23, 25 or 26, wherein the step of introducing excess oxygen includes the combustion of fuel without the participation of air in the combustion process.

29. The method of claims 23, 25 or 26 further comprising the step of preheating combustion air prior to its introduction into the combustion process.

30. A method of controlling the heating of materials in furnaces by introduction into the interior of the furnace of hot combustion products of carbon containing fluid fuel through a burning device having two separate oxidizing gas streams, each having individually variable oxygen content in the range of between 20–100% oxygen and also being directed separately through the combustion chamber of the burning device toward the material being heated, comprising the steps of:

continuously measuring representative technological parameters to recognize the current stage of the heating process and using said parameters as the base data for a programmed controlling device;

continuously sensing the instant flow of air, fuel and oxygen and supplying representative electrical signals for said flows to said programmed controlling device;

continuously defining by said programmed controlling device, based on the recognized current stage of heating process, the optimum instant fuel flow and the air flow and oxygen flow to each separate oxidizing gas stream to economize the heating cycle by maximizing heat exchange between the flame and the material being heated;

continuously controlling, through flow regulating means, the fuel supply and the air and oxygen supply to each of the separate oxidizing gas streams to set the instant flow supplied to match the optimum instant flows as defined by said programmed controlling device to maintain the heat input, flame temperature, velocity and emissivity of the combustion products.

31. The method of claim 30, wherein said representative technological parameters include the temperature of the process.

32. The method of claim 30, wherein said representative technological parameters include the accumulated time of heating.

33. The method of claim 30, wherein said representative technological parameters include the accumulated energy consumption.

34. The method of claim 30, further comprising the step of continuously controlling the proportions of total flow of oxygen and air supplied to the burning device in the first oxidizing gas stream and separately controlling the oxygen and air in the second oxidizing gas stream.

35. The method of claim 30, further comprising the step of continuously controlling the flow of oxygen to balance the total amount of oxygen being introduced throughout the combustion chamber, to penetrate into the material being heated.

36. The method of claim 30, further comprising the step of continuously controlling the flow of fuel to balance the total amount of oxygen being introduced throughout the combustion chamber, to correct any inability of the desired amount of air flow to penetrate into the material being heated.

37. The method of claims 30, 31, 32, 33, 34, 35 or 36, further comprising the step of continuously controlling the amount of excess oxygen being introduced to the process to support an exothermic oxidation reaction of certain components of the material being heated or refined.

38. The method of claim 37, wherein said excess oxygen is introduced to the process in a supersonic stream.

39. A hydrocarbon fluid fuel burner to reduce the comsumption of fuel and pure oxygen in a heating process, which comprises:

a combustion block having a combustion chamber therein;

means for cooling said combustion chamber with a liquid;

liquid cooled outlet means of said communication block for arranging a final flame pattern by discharging the products of combustion from the combustion chamber;

means for separately supplying hydrocarbon fluid fuel and two oxygen based oxidizing gases to said combustion block;

means for directing said first oxidizing gas having a given oxygen concentration through at least one opening in the combustion chamber wall toward said combustion chamber outlet nozzle;

means for directing said hydrocarbon fuel into said combustion chamber in a stream directed through at least one opening in the combustion chamber wall about said first oxidizing gas so that said hydrocsrbon fuel is caused to be mixed with said first oxidizing gas to stabilize combustion within said liquid cooled combustion chamber by creating a highly luminous hot flame core extending throughout said combustion chamber;

means for directing said second oxidizing gas having different oxygen concentration from said first oxidizing gas through at least one opening in the combustion chamber wall into said combustion chamber in a stream direction about and toward said hydrocarbon fuel in the flame core so that said second oxidizing gas initially insulates said core from cooling by contact with the fluid cooled block prior to being mixed with said hydrocarbon fuel; and means for controlling the final flame pattern oxidizing ability, temperature, luminousity and velocity by controlling distribution and proportions of the amount of total oxygen being introduced by oxygen and air containing first and second oxidizing gases.

40. The burner of claim 39, wherein said hydrocarbon fuel directing means comprises a plurality of jets angled toward said first oxidizing gas.

41. The burner of claim 39, wherein said second oxidizing gas directing means comprises a plurality of jets angled toward said flame core.

42. The burner of claim 39, wherein said second oxidizing gas directing means comprises at least one tangentially directed jet.

43. The burner of claim 39, wherein said second oxidizing gas directing means directs said gas to the hot flame core in increments along the length of the combustion chamber.

44. The burner of claim 39, wherein said combustion block is made of a high thermal conductivity material.

45. The burner of claim 44, wherein said high thermal conductivity material is copper.

46. The burner of claim 39, wherein the combustion chamber of said combustion block is generally conical with the wider end at the face of said burner, and wherein said second oxidizing gas channels open onto the conical face of the combustion chamber to create film cooling.

47. The burner of claim 39, wherein said means for directing said first oxidizing gas includes means for introducing said first oxidizing gas in a supersonic jet.

48. The burner of claim 39, which further comprises a means for directing a third oxidizing gas from said combustion chamber outlet nozzle downwardly with respect to the center line of the combustion chamber, so that the third oxidizing gas may oxidize a different area of product being heated.

49. The burner of claim 48, wherein said third oxidizing gas is oxygen introduced in a jet which has supersonic velocity.

*50. An economizing method of fluid fuel combustion in an ongoing flame formed in a combustion chamber within a liquid cooled combustion block having an outlet nozzle directed into a hot furnace interior, to reduce the consumption of fuel and pure oxygen in heating processes, comprising the steps of:*

*separately supply fluid fuel and at least first and second oxygen based oxidizing gases to the combustion chamber;*

*directing said fuel through at least one opening in the combustion chamber wall into the combustion chamber;*

*directing said first oxidizing gas into said combustion chamber in a stream directed through at least one opening in the combustion chamber wall toward said fuel so that said first oxidizing gas is caused to be mixed with said fuel to stabilize combustion within the combustion chamber thereby creating a highly luminous hot flame core extending throughout said combustion chamber;*

*directing said second oxidizing gas having different oxygen concentration from said first oxiding gas through at least one opening in the combustion chamber wall into said combustion chamber in a stream directed about and toward said flame core so that said second oxidizing gas initially insulates said core from cooling by contact with the liquid cooled block prior to being mixed with flame core for final combustion;*

*discharging the products of combustion from the combustion chamber through a liquid cooled nozzle opening toward the furnace interior; and*

*controlling the flow of said fuel and said first and second oxidizing gases.*

*51. The method of fluid fuel combustion of claim 50, wherein said first oxidizing gas has a higher oxygen concentration than said second oxidizing gas.*

*52. The method of fluid fuel combustion of claim 50, wherein the amount of oxygen supplied by said first oxidizing gas is less than fifty percent of the stoichiometric amount of oxygen required to completely combust the fuel.*

*53. The method of fluid fuel combustion of claim 50, wherein said first oxidizing gas and said second oxidizing gas are partially mixed together prior to said two oxidizing gas streams reacting with said fluid fuel.*

*54. The method of fluid fuel combustion of claim 50, wherein said first oxidizing gas is directed into said combustion chamber as a plurality of streams which surround each of said openings for directing said fuel into said combustion chamber.*

*55. The method of fluid fuel combustion of claim 50, wherein said flow controlling step comprises the steps of:*

*controlling the ratio of fuel to the total oxygen in said two oxidizing gases to control flame stoichiometry; and*

*controlling the ratio of said first oxidizing gas to said second oxidizing gas being supplied to the combustion chamber to control the adiabatic temperature of the flame.*

*56. The method of fluid fuel combustion of claim 55, which further comprises the step of increasing the oxygen in said second oxidizing gas to further increase the adiabatic flame temperature.*

*57. The method of claims 55 or 56 which further comprises the step of monitoring the current process temperature for determining the appropriate ratios for said controlling steps as the process continues.*

*58. The method of claims 55 or 56 which further comprises the steps of measuring the accumulated energy input to the process for determining the stage of the process and the ratios to be applied in said controlling steps as the process continues.*

*59. The method of claims 55 or 56 which further comprises the step of timing the process for determining the stage of the process and the ratios to be applied in said controlling steps.*

*60. The method of claim 57, wherein said controlling steps are accomplished by electronic computer means.*

*61. The method of claim 58, wherein said controlling steps are accomplished by electronic computer means.*

*62. The method of claim 59, wherein said controlling steps are accomplished by electronic computer means.*

*63. The method of claims 50 or 55, wherein said first oxidizing gas is pure oxygen.*

*64. The method of claims 50 or 55, wherein said second oxidizing gas is air.*

*65. The method of claim 50, wherein said fuel is directed into said combustion chamber through a multiplicity of openings in the combustion chamber.*

*66. The method of claim 50, wherein said first oxidizing gas is directed into said combustion chamber through a multiplicity of openings in the combustion chamber.*

67. The method of claim 50, wherein said second oxidizing gas is directed into said combustion chamber through a multiplicity of openings in the combustion chamber.

68. The method of claim 50, wherein said second oxidizing gas is introduced into the combustion chamber in at least one tangentially directed jet.

69. The method of claim 50, wherein said second oxidizing gas is directed to the hot flame core in increments along the length of the combustion chamber.

70. The method of claim 50, which further comprises the step of directing a third oxidizing gas from said combustion chamber outlet nozzle downwardly with respect to the center line of the combustion chamber, so that the third oxidizing gas may oxidize a different area of product being heated.

71. The method of claim 70, wherein said third oxidizing gas is oxygen introduced in a jet which has supersonic velocity.

72. A method of heating and melting materials in a furnace, comprising the steps of:

directing a flame produced within liquid cooled combustion tunnel of a burner to the material to be heated, said flame formed by mixing and combusting a fuel stream with air and oxygen, at a ratio of fuel to total oxygen about stoichiometric, said air and oxygen being supplied in two oxidizing gas streams of different oxygen concentrations;

raising the ratio of total oxygen to total air in the flame, to increase the adiabatic flame temperature, as the temperature of the material increases to achieve a temperature of the material at which an exothermic reaction of oxidation of some component of the material can be initiated; and then directing through the combustion tunnel excess oxygen to increase the ratio of total oxygen to fuel substantially above stoichiometric to release exothermic heat from oxidation of some components of the materials in the furnace being continuously heated by said flame.

73. The method of claim 72, also used to refine the material, which further comprises the steps of:

after the material is generally melted, reducing the fuel and air supplied to the combustion mixture, to rearrange the flame pattern;

directing a jet of oxygen through the flame to the material; and contacting said jet of oxygen with the molten material at the zone at which the material is being heated by said rearranged flame, to conduct the exothermic oxidation reaction of refining.

74. A method of controlling the heating of materials in furnaces by introduction into the interior of the furnace, through a burning device, of hot combustion products of carbon containing fluid fuel and at least two different oxidizing gas streams directed separately into the combustion chamber of the burning device, said oxidizing gas streams having different oxygen content in the range of between 20–100% oxygen, comprising the steps of:

continuously measuring representative technological parameters to recognize the current stage of the heating process and using said parameters as the base data for a programmed controlling device;

continuously defining by said programmed controlling device, based on the recognized current stage of heating process, the optimum instant flows of said fuel and said oxidizing gas streams to economize the heating cycle by maximizing heat exchange between the flame and the material being heated; and continuously controlling, through flow regulation means, the flow of said fuel and said oxidizing gas streams to set the instant flow supplied to match the optimum instant flows as defined by said programmed controlling device, to maintain the heat input, flame temperature, velocity and emissivity of the combustion products.

75. The method of claim 74, which further comprises supplying air and concentrated oxygen to form at least one variable oxidizing gas stream and wherein said controlling step comprises controlling the air and concentrated oxygen supplied to said variable stream.

76. The method of claim 75, which further comprises the step of continuously sensing the instant flows of air, fuel and oxygen and supplying representative electrical signals for said flows to said programmed controlling device.

77. The method of claim 74, wherein one said at least two oxidizing gas streams is pure oxygen.

78. The method of claim 77, wherein another oxidizing gas stream is air.

79. The method of claim 74, wherein said representative technological parameters include the temperature of the process.

80. The method of claim 74, wherein said representative technological parameters include the accumulated time of heating.

81. The method of claim 74, wherein said representative technological parameters include the accumulated energy consumption.

82. A fluid fuel burner to reduce the consumption of fuel and pure oxygen in a heating process, which comprises:

a combustion block having a combustion chamber therein;

means for cooling said combustion chamber with a liquid;

liquid cooled outlet means of said combustion block for arranging a final flame pattern by discharging the products of combustion from the combustion chamber;

means for separately supplying fluid fuel and two oxygen based oxidizing gases, at least one of which comprises air, to said combustion block;

means for directing said fuel through at least one opening in the combustion chamber wall into said combustion chamber;

means for directing said first oxidizing gas having a given oxygen concentration through at least one opening in the combustion chamber wall into said combustion chamber in a stream directed so that said first oxidizing gas is caused to be mixed with said fuel to stabilize combustion with said liquid cooled combustion chamber by creating a highly luminous hot flame core extending throughout said combustion chamber;

means for directing said second oxidizing gas having different oxygen concentration from said first oxidizing gas through at least one opening in the combustion chamber wall into said combustion chamber in a stream directed about and toward the flame core so that said second oxidizing gas initially insulates said core from cooling by contact with the fluid cooled block prior to being mixed with the flame core; and means for controlling the final flame pattern, oxidizing ability, temperature, luminosity and velocity by controlling the total amount of oxygen introduced in said oxidizing gases, and by controlling the distribution of oxygen and air being introduced with said first and second oxidizing gases.

*83. The burner of claim 82, wherein said fuel directing means comprises a plurality of jets directed to mix with said first oxidizing gas directing means.*

*84. The burner of claim 82, wherein said first oxidizing gas directing means comprises a plurality of jets directed to mix with said fuel.*

*85. The burner of claim 84, wherein said second oxidizing gas directing means comprises a plurality of jets directed toward said flame core.*

*86. The burner of claim 82, wherein said second oxidizing gas directing means comprises at least one tangentially directed jet.*

*87. The burner of claim 82, wherein said second oxidizing gas directing means directs said gas to the hot flame core in increments along the length of the combustion chamber.*

*88. The burner of claim 82, wherein said combustion block is made of a high thermal conductivity material.*

*89. The burner of claim 88, wherein said high thermal conductivity material is copper.*

*90. The burner of claim 82, wherein the combustion chamber of said combustion block is generally conical with the wider end at the face of said burner, and wherein said second oxidizing gas channels open onto the conical face of the combustion chamber to create film cooling.*

*91. The burner of claim 82, which further comprises a means for directing a third oxidizing gas from said combustion chamber outlet nozzle downwardly with respect to the center line of the combustion chamber, so that the third oxidizing gas may oxidize a different area of product being heated.*

*92. The burner of claim 91, wherein said third oxidizing gas is oxygen introduced in a jet which has supersonic velocity.*

*93. The burner of claim 82, wherein said means for directing said first oxidizing gas and said means for directing said second oxidizing gas causes said two oxidizing gases to be partially mixed together prior to said first and second oxidizing gases being mixed with said fuel.*

*94. The burner of claim 82, wherein the combustion chamber in said combustion block has a converging-diverging shape to allow supersonic velocity at said outlet means.*

* * * * *

UNITED STATES PATENT AND TRADEMARK OFFICE

CERTIFICATE OF CORRECTION

PATENT NO. : RE 33,464

DATED : November 27, 1990

INVENTOR(S) : Grigory M. Gitman

It is certified that error appears in the above-identified patent and that said Letters Patent is hereby corrected as shown below:

Column 1, line 13, delete "abandoned" and insert now U.S. Patent No. 4,622,007 issued on November 11, 1986.--

Signed and Sealed this

Twenty-ninth Day of September, 1992

*Attest:*

DOUGLAS B. COMER

*Attesting Officer*

*Acting Commissioner of Patents and Trademarks*